US012627062B2

(12) United States Patent
Byers et al.

(10) Patent No.: US 12,627,062 B2
(45) Date of Patent: May 12, 2026

(54) ANTENNA SYSTEM

(71) Applicant: Honeywell Federal Manufacturing & Technologies, LLC, Kansas City, MO (US)

(72) Inventors: Kyle J. Byers, Kansas City, MO (US); Brian C. Rutherford, Stilwell, KS (US); Matt Clewell, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 111 days.

(21) Appl. No.: 17/865,685

(22) Filed: Jul. 15, 2022

(65) Prior Publication Data

US 2022/0368020 A1 Nov. 17, 2022

Related U.S. Application Data

(62) Division of application No. 16/542,476, filed on Aug. 16, 2019, now Pat. No. 11,424,545.

(60) Provisional application No. 62/720,528, filed on Aug. 21, 2018.

(51) Int. Cl.
*H01Q 11/08* (2006.01)
*H01Q 1/22* (2006.01)

(52) U.S. Cl.
CPC ......... *H01Q 11/083* (2013.01); *H01Q 1/2283* (2013.01)

(58) Field of Classification Search
CPC .......... H01Q 1/362; H01Q 5/335; H01Q 1/52; H01Q 9/06; H01Q 9/27; H01Q 11/08
See application file for complete search history.

(56) References Cited

U.S. PATENT DOCUMENTS

| | | | | |
|---|---|---|---|---|
| 6,992,314 | B2 | 1/2006 | Masaki et al. | |
| 7,474,272 | B2 | 1/2009 | Lamoureux et al. | |
| 8,256,685 | B2 | 9/2012 | Chen et al. | |
| 8,307,535 | B2 | 11/2012 | Feller et al. | |
| 8,502,735 | B1 * | 8/2013 | Moosbrugger | H01Q 3/30 343/702 |
| 8,745,853 | B2 | 6/2014 | Grbic et al. | |
| 8,810,466 | B2 | 8/2014 | Sciré-Scappuzzo et al. | |
| 10,270,186 | B2 | 4/2019 | Teshima et al. | |
| 10,811,777 | B1 * | 10/2020 | Fuchi | H01Q 3/01 |
| 2012/0038526 | A1 * | 2/2012 | Lim | H01Q 9/0407 343/700 MS |
| 2017/0097440 | A1 * | 4/2017 | Stolarczyk | H01Q 9/0442 |

* cited by examiner

*Primary Examiner* — Wei (Victor) Y Chan
(74) *Attorney, Agent, or Firm* — Hovey Williams LLP

(57) ABSTRACT

An antenna system comprises a substrate, an antenna positioned on the substrate, and a circuit component positioned on the substrate. The antenna is positioned on a first surface of the substrate and operable to emit a radiation pattern. The circuit component is positioned on the substrate in a null region of the radiation pattern. The thickness of portions of the substrate are modified to achieve a desired performance characteristic of the antenna.

6 Claims, 5 Drawing Sheets

ANTENNA SYSTEM

RELATED APPLICATIONS

The present application is a divisional application and claims the priority benefit of co-pending U.S. patent application Ser. No. 16/542,476, filed on Aug. 16, 2019, and entitled "ANTENNA SYSTEM", which claims the priority benefit of U.S. Provisional Patent Application Ser. No. 62/720,528, filed Aug. 21, 2018, both of which are incorporated by reference in their entireties herein.

STATEMENT REGARDING FEDERALLY-SPONSORED RESEARCH OR DEVELOPMENT

This invention was made with Government support under Contract No.: DE-NA00002839 awarded by the United States Department of Energy/National Nuclear Security Administration. The Government has certain rights in the invention.

FIELD OF THE INVENTION

The present invention generally relates to electrically small antennas, antenna circuits, and methods of manufacturing the same.

BACKGROUND

Many devices use antennas for various radio frequency (RF) applications. For example, antennas are used in communication systems, global positioning systems (GPS), telecommunication systems, cellular systems, radio systems, transceivers, transmitters, receivers, Bluetooth® and Wifi systems, and the like. The size and shape of antennas are often a function of frequency requirements, power needs, and/or additional considerations. For various application-related reasons, such as portability, battery size, component complexity, z available space for antennas within a device is often limited. Additionally, the signals from antennas can interfere with the functionality and/or performance of nearby electronics, and the electronics sometimes interfere with the signals to and/or from the antennas. Enclosing electronic components in conductive material, or shielding, is often used to prevent such interference. However, shielding increases manufacturing costs and time, occupies additional space in the devices, and can sometimes degrade the performance of antennas and/or other circuit components.

The background discussion is intended to provide information related to the present invention which is not necessarily prior art.

SUMMARY

The present invention solves the above-described problems and other problems by providing an antenna system that enables more compact circuit packaging without affecting electrical performances of the antenna and circuit components.

An antenna system constructed in accordance with an embodiment of the present invention comprises a substrate, an antenna positioned on a first surface of the substrate, and a circuit positioned on the substrate. The antenna emits a radiation pattern with a null region. The circuit component is positioned on the substrate in the null region of the radiation pattern so as to avoid electromagnetic interference on the circuit component due to the radiation pattern of the antenna.

Another embodiment of the antenna system comprises a hemispherical antenna, a substrate supporting the antenna, and a circuit component. The hemispherical antenna has a plurality of arms that wind down from a top of the hemispherical antenna and define a space above the substrate. The antenna emits a radiation pattern with a null region in the space. The circuit component may include a matching circuit for the hemispherical antenna and functional components for the hemispherical antenna. The circuit component is located on the substrate in the null region so as to avoid electromagnetic interference on the circuit due to the radiation pattern of the antenna.

Another embodiment of the invention is a method of fabricating an antenna system. The method comprises depositing an antenna on a first surface of a substrate, the antenna being configured to emit a radiation pattern that forms a radiation region. The method further comprises positioning one or more circuit components on the substrate below at least a portion of the antenna outside of the radiation region. This avoids electromagnetic interference on the circuit due to the radiation pattern of the antenna.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

Figure 1:
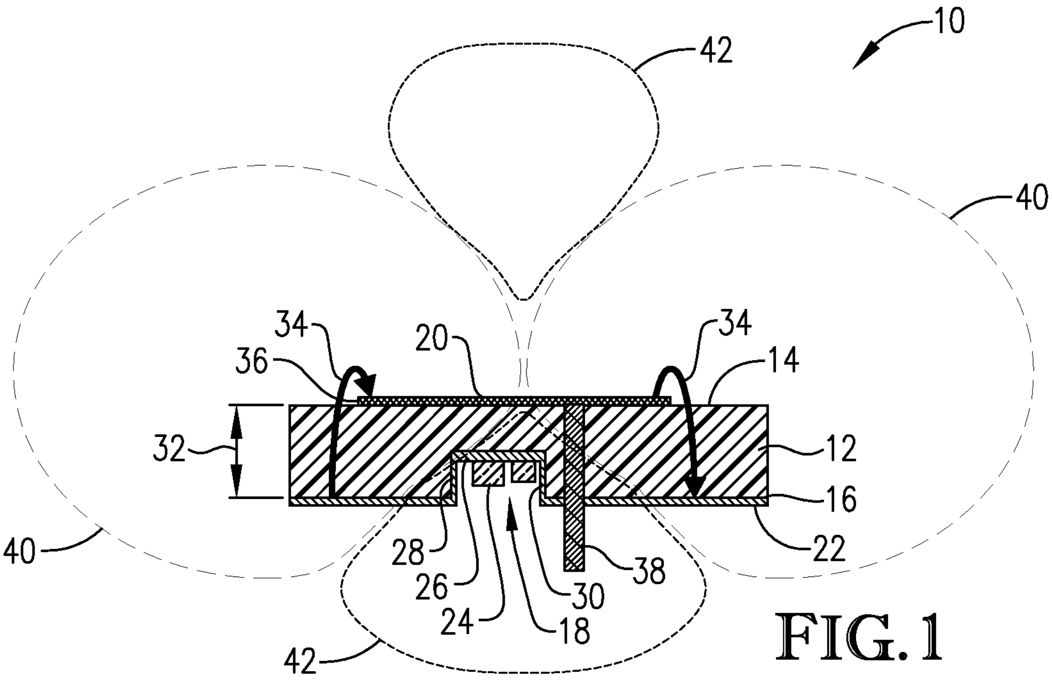
FIG. 1 is a side perspective view of an exemplary antenna system constructed in accordance with a first embodiment of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present embodiments relate to, inter alia, antennas, antenna systems, electrically small antennas, circuit components of antennas, and methods of manufacturing the same. The antennas and circuit components may be for transmitting and/or receiving electromagnetic signals and may be included in electronic devices for any number of radio frequency applications.

During operation, an antenna may emit radio signals comprised of electromagnetic waves. The electromagnetic waves include electric fields and magnetic fields. The electric and magnetic fields may propagate in certain directions depending on a shape and orientation of the antenna, as well as the material near the antenna. The direction and strength of the electric and magnetic fields constitute the radiation pattern.

Embodiments of the present invention provide an improved antenna system that preserves space and enhances antenna performance. An embodiment of the antenna system comprises a substrate, an antenna, and a circuit component placed outside the radiation region, or in the null region, but near the antenna so that space is used more efficiently. The antenna may have any shape or orientation, depending on the desired radiation pattern, RF application, desired frequency band, or other considerations. The antenna may include conductive material such as metals or conductive carbon material. The antenna may be a microstrip patch antenna, a dipole antenna, an electrically small antenna, or the like. A microstrip patch antenna may be a patch of conductive material having a specific shape for transmitting and/or receiving electromagnetic waves. A dipole antenna may be any antenna that produces a radiation pattern similar to that of an electric dipole. An electrically small antenna is an antenna that is significantly shorter than a wavelength of the electromagnetic wave the antenna is configured to send and/or receive.

The substrate of the antenna system may be modified to improve antenna performance. The thickness of a portion of the substrate may be modified to achieve a desired electrical characteristic, such as a specific capacitance between the antenna and a ground plane. The modification may achieve a desired performance characteristic, such as, for example, a specific bandwidth, sensitivity, resonance of an antenna, or it may optimize a fringe electric field and/or magnetic field extant between the antenna and the ground plane.

The circuit component may be part of a matching circuit or a functional component. A matching circuit may include a resistor, a capacitor, an inductor, etc. A functional component may include an integrated chip (IC), a driver circuit, an amplifier, a filter, a modulator, a multiplexer, a demultiplexer, a clock circuit, and/or any other electronics component. The circuit component may include any passive component, an active component, or the like, including a resistor, a capacitor, an inductor, a diode, a transformer, transistors, rectifiers, amplifiers, etc. The circuit component may even include a power source, such as a battery, or a connector configured to connect to an external power source.

The system may include additional, less, or alternate functionality, including that discussed elsewhere herein.

Exemplary Antenna System

FIG. 1 depicts an exemplary antenna system 10 constructed in accordance with embodiments of the present invention. The antenna system 10 comprises a substrate 12 having a first surface 14, a second surface 16 opposite to the first surface 14, and a recess 18 formed on the second surface 16; an antenna 20 disposed on the first surface 14 of the substrate 12; a ground plane 22 disposed on the second surface 16; and a circuit component 24 positioned in the recess 18 of the substrate 12.

The substrate 12 may be a portion of a circuit board, an independent board, a dielectric material, a nonconductive material, or the like. The substrate 12 is provided as a support for placing the antenna 20 and the circuit component 24. The substrate 12 defines the recess 18 for placing the circuit component 24 so that the top opening of the recess 18 is on the second surface 16. The recess 18 may extend only within a portion of the substrate 12, such as within a null region of a radiation pattern of the antenna 20 (as discussed further below). The recess 18 may additionally or alternatively extend along a length of the substrate 12 to form a channel or groove. The recess 18 may be at least partially within the null region of the radiation pattern of the antenna 20. The recess 18 may include a ground plane 26 of its own, as well as one or more pairs of opposing vertical ground plane walls 28, 30. The ground plane walls 26, 28, 30 may be electrically connected to each other and/or ground plane 22. The ground planes 26, 28, 30 of the recess 18 may be provided for reflecting electromagnetic waves emitted from the antenna 20, the circuit component 24, and/or another electromagnetic wave source. The ground planes 26, 28, 30 may be made of conductive material. While FIG. 1 depicts a ground plane 26 and ground plane walls 28, 30, the antenna system 10 may have any number of ground planes with any configuration, and/or the recess 18 may form any shape without departing from the scope of the present invention. For example, the recess 18, the ground plane 26, and/or the ground plane walls 28, 30 may form an open-bottom cube. The recess 18 and/or the ground plane 26 may alternatively form a semispherical shape. Additionally, the position of the recess 18 may be in different locations on the substrate 12 for different antennas or radiation patterns without departing from the scope of the present invention.

The substrate 12 may also be configured to achieve a desired performance characteristic of the antenna 20. For example, the substrate 12 may have a thickness 32 configured to achieve a desired performance characteristic of the antenna 20, such as a desired capacitance between the antenna 20 and the ground plane 22 so that an optimal fringe electric field 34 is achieved.

For example, the material properties of the substrate 12 affect the electrical properties of any electric and/or magnetic field between the antenna 20 and the ground plane 22. As an example, one such material property is the thickness 32 of the substrate 12. The thickness 32 of the substrate 12 affects the capacitance between the antenna 20 and the ground plane 22. The capacitance may be determined by the area of the antenna 20, the distance between the antenna 20 and the ground plane 22, the thickness 32 of the substrate 12, and/or a constant related to a material of the substrate 12. The substrate 12 may additionally or alternatively be made of a material configured to achieve a desired performance characteristic by having a specific ε-constant. For example, the substrate 12 may be made of flame retardant-4 (FR4), RO5870, RO4350, and/or the like. The relationship between these attributes is shown in Equation 1, where the capacitance is C and the constant related to the material of the substrate 12 is ε.

$$C = \varepsilon \cdot \frac{\text{Area}}{\text{Distance}} \tag{1}$$

By modifying the capacitance between the antenna 20 and the ground plane 22, the detection of changes in electric field between the antenna 20 and the ground plane 22 may be affected, as characterized in Equation 2 where the signal i is affected by the capacitance C and change in electric field dv/dt. Further, the fringe electric field 34, which is an electric field extant near an edge 36 of the antenna 20, may also be affected by modifications of the capacitance between the antenna 20 and the ground plane 22.

$$i = C \cdot \frac{dv}{dt} \tag{2}$$

The antenna 20 is provided for sending and/or receiving electromagnetic signals. The antenna 20 may be a microstrip patch antenna having any shape or pattern. The antenna 20 may be positioned using any number of techniques, including additive manufacture (AM), electroless plating, electrolytic plating, etc. The antenna 20 may be made of conductive material, including metal, such as copper, silver, gold, platinum, etc., or conductive carbon. In one embodiment, the antenna 20 may be connected to an antenna feed 38. The antenna feed 38 may extend from the second surface 16 of the substrate 12, through the substrate 12, and through the first surface 14 to electrically connect to the antenna 20. The antenna feed 38 may be for passing a signal to the antenna 20 for transmission or for receiving a signal from the antenna 20. The antenna 20 may be configured to emit a radiation pattern about the substrate 16.

The radiation pattern of the antenna 20 includes electromagnetic waves emitted from the antenna 20 in both the near fields and far fields encompassing both electric and magnetic fields and forms a radiation region 40 near the antenna 20. The region near the antenna experiencing minimal to no radiation is the null region 42. Any number of antenna types, shapes, materials, etc. may be used without departing from the scope of the present invention. For example, the antenna 20 may include a microstrip patch antenna.

The ground plane 22 of the substrate 12 is similarly provided as a reflecting surface for electromagnetic waves. The ground plane 22 may reflect the electromagnetic waves emitted from the antenna 20, the circuit component 24, or another source. The shape and pattern of the ground plane 22 may vary depending on the application. The ground plane 22 on the second surface 16 of the substrate 12 may be electrically connected to the ground planes 26, 28, 30 of the recess 18. The ground plane 22 may also include an aperture 44 through which the antenna feed 38 passes. The ground plane 22 may be electrically isolated form the antenna feed 38.

The circuit component 24 may be provided for operation of the antenna 20, or it may be unrelated to the antenna 20. The circuit component 24 is placed in the null region 38, or outside the radiation region 36, in the recess 18 of the substrate 12. The circuit component 24 may include a matching circuit, a functional component of the antenna 20, an antenna drive component, an active component, a passive component, or the like. The circuit component 24 may be electrically connected to the antenna feed 38 and/or the antenna 20. In one embodiment, the antenna system 10 may include a plurality of circuit components. The one or more circuit components 24 may be positioned on the ground plane 26 and/or the ground plane walls 28, 30.

Exemplary Antenna System with Substrate Having a Platform

Figure 2:
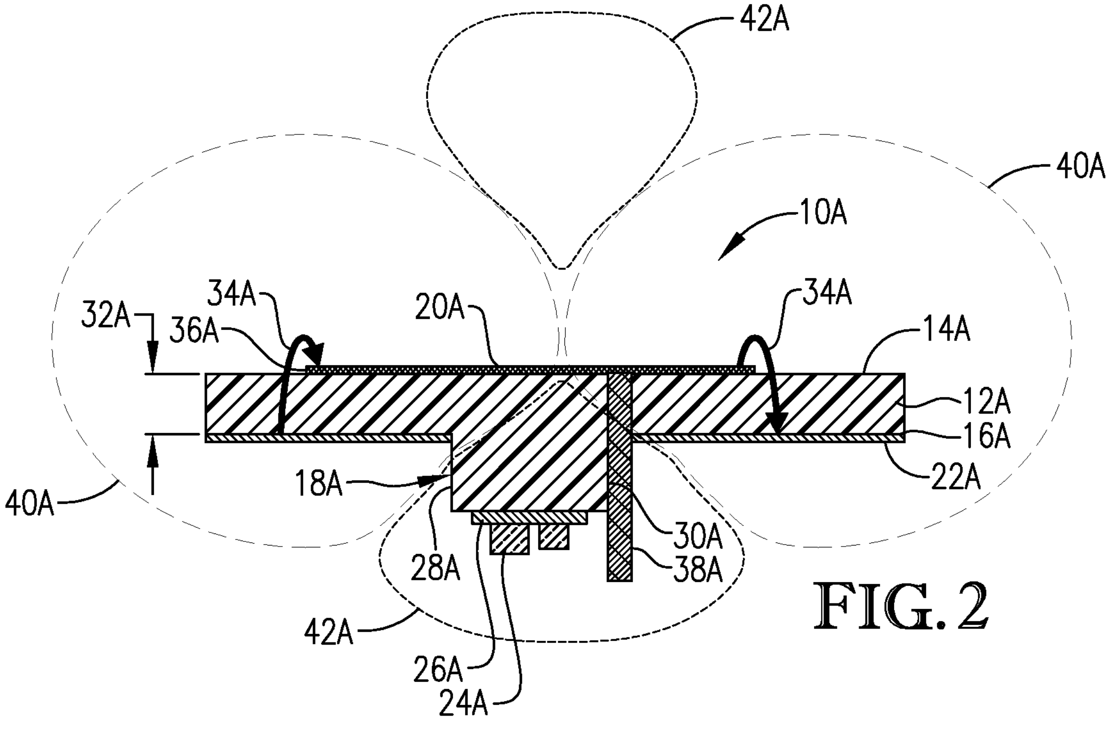
FIG. 2 is a side perspective view of an exemplary antenna system having a circuit component platform constructed in accordance with a second embodiment of the present invention.

In some embodiments, the capacitance between the antenna and the ground plane needs to be increased, while the circuit components remain outside the radiation region. FIG. 2 depicts an antenna system 10A constructed in accordance with another embodiment of the present invention. The antenna system 10A may comprise substantially similar components as antenna system 10; thus, the components of antenna system 10A that correspond to similar components in antenna system 10 have an 'A' appended to their reference numerals.

The antenna system 10A comprises a substrate 12A having a first surface 14A, a second surface 16A opposite to the first surface 14A, and a platform 18A formed on the second surface 16A; an antenna 20A disposed on the first surface 14A of the substrate 12A and configured to generate a radiation pattern; a ground plane 22A disposed on the second surface 16A; a circuit component 24A positioned on the platform 18A of the substrate 12A in a null region 42A outside of a radiation region 40A; and an antenna feed 38A.

The thickness 32A of portions of the substrate 12A may be less than the thickness 32 of portions of the substrate 12 in order to achieve, for example, a higher capacitance. The reduced thickness 32A may also achieve a desired effect on the fringe electric field between the antenna 20A and the ground plane 22A. A portion 18A of the substrate 12A may be thicker than the rest of the substrate 12A to form a platform 18A having two or more vertical walls 28A, 30A. A circuit component ground plane 26A may be placed on portions of the platform 18A. The circuit component 24A may be positioned on the platform 18A within the null region 42A, or outside the radiation region 40A of the radiation pattern emitted from the antenna 20A. The circuit component 24A may be positioned anywhere on the platform 18A without departing from the scope of the present invention. The circuit component 24A may be positioned on the circuit component ground plane 26A and/or the side walls 28A, 30A of the platform 18A. The platform 18A may be any shape without departing from the scope of the present invention. For example, the platform 18A may be a single protrusion or a shelf extending along a length of the substrate 12A.

Exemplary Antenna System with Encapsulated Circuit Component

Figure 3:
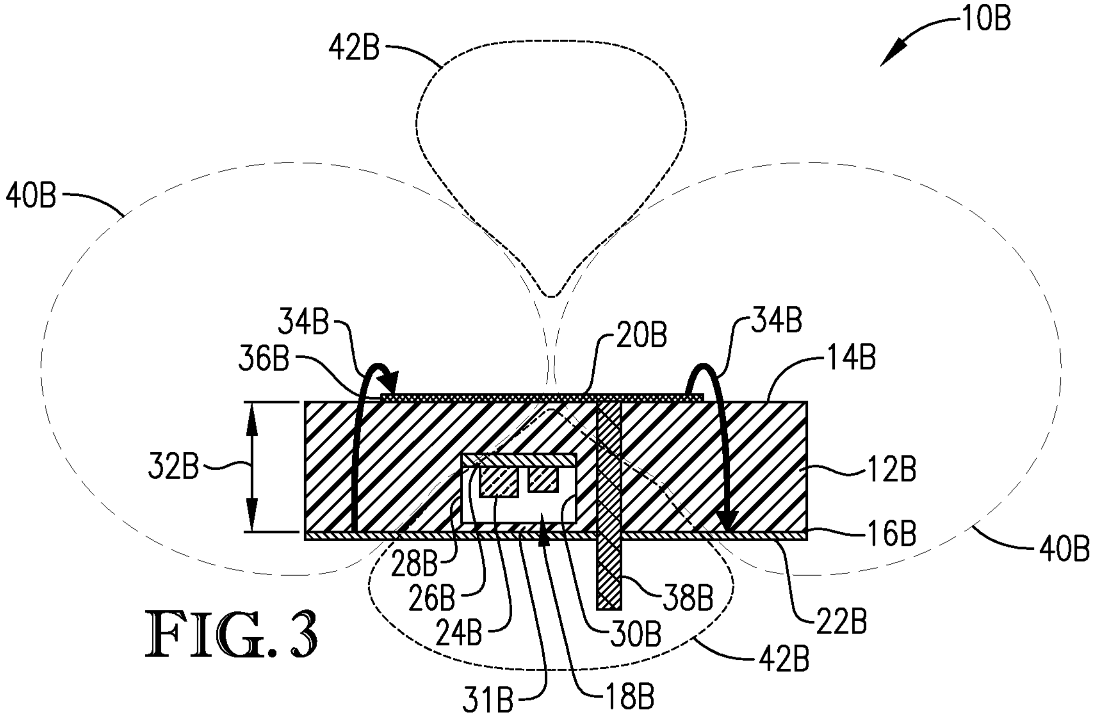
FIG. 3 is a side perspective view of an exemplary antenna system having an enclosed circuit component and constructed in accordance with a third embodiment of the present invention.

FIG. 3 depicts an exemplary antenna system 10B constructed according to embodiments of the present invention. The antenna system 10B may comprise substantially similar components as antenna system 10; thus, the components of antenna system 10B that correspond to similar components in antenna system 10 have a 'B' appended to their reference numerals.

The antenna system 10B comprises a substrate 12B having a first surface 14B, a second surface 16B opposite to the first surface 14B, and a chamber 18B formed between the first surface 14B and the second surface 16B; an antenna 20B disposed on the first surface 14B of the substrate 12B and configured to generate a radiation pattern; a ground plane 22B disposed on the second surface 16B; a circuit component 24B positioned in the chamber 18B of the substrate 12B in a null region 42B outside of a radiation region 40B; and an antenna feed 38B.

The substrate 12B may be a portion of a circuit board, a separate board, a dielectric material, a nonconductive material, or the like. The substrate 12B supports the antenna 20B and provides an enclosure for the circuit component 24B. The substrate 12B may define the chamber 18B for placing the circuit component 24B. The thickness 32B of the substrate 12B may also be configured to achieve a desired performance characteristic for the antenna 20B.

The chamber 18B of the substrate 12B may be formed at least partially within the null region 42B of the radiation pattern of the antenna 20B. The chamber 18B may include a ground plane 26B, one or more opposing vertical walls 28B, 30B, and a ceiling 31B. The ground plane 26B of the chamber 18B may be provided for reflecting electromagnetic waves emitted from the antenna 20B, the circuit component 24B, and/or another source. The ground plane 26B may be made of conductive material. The chamber 18B may be any shape without departing from the scope of the present invention. For example, the chamber 18B may be an enclosure that completely surrounds the component 24B. Alternatively, the chamber 18B may be a bore extending through the substrate 12B between the first surface 14B and the second surface 16B and having an opening on one or more end of the substrate 12B. The position of the chamber 18B may be in different locations in the substrate 12B for different antennas or radiation patterns and may have different shapes without departing from the scope of the present invention.

The antenna 20B is configured to transmit and/or receives signals. The antenna 20B may be a microstrip patch antenna. The antenna 20B may be connected to the antenna feed 38B. The antenna feed 38B may extend from the second surface 16B of the substrate 12B, through the substrate 12B, and through the first surface 14B to connect to the antenna 20B. The antenna feed 38B may be similar to the antenna feed 38 discussed above. Any number of antenna types, shapes, materials, etc. may be used without departing from the scope of the present invention.

The ground plane 22B of the substrate 12B is similar to the ground plane 22 discussed above. The ground plane 22B may reflect the electromagnetic waves emitted from the antenna 20B, the circuit component 24B, or from another source. The shape and pattern of the ground plane 22B may vary depending on the application. The ground plane 22B may be electrically connected to the ground plane 26B of the chamber 18B. The ground plane 22B may also include an aperture 44B through which the antenna feed 38B passes. The ground plane 22B may also be electrically isolated from the antenna feed 38B.

The circuit component 24B may be similar to the circuit component 24 discussed above. In one embodiment, the antenna system 10B may include a plurality of circuit components. The circuit component 24B may be positioned anywhere in the chamber 18B without departing from the scope of the present invention. For example, the circuit component 24B may be positioned on the ground plane 22B, the vertical walls 28B, 30B, and/or the ceiling 31B in the chamber 18B.

Exemplary Antenna System with Antenna Having One or More Helical Arm

Figure 4A:
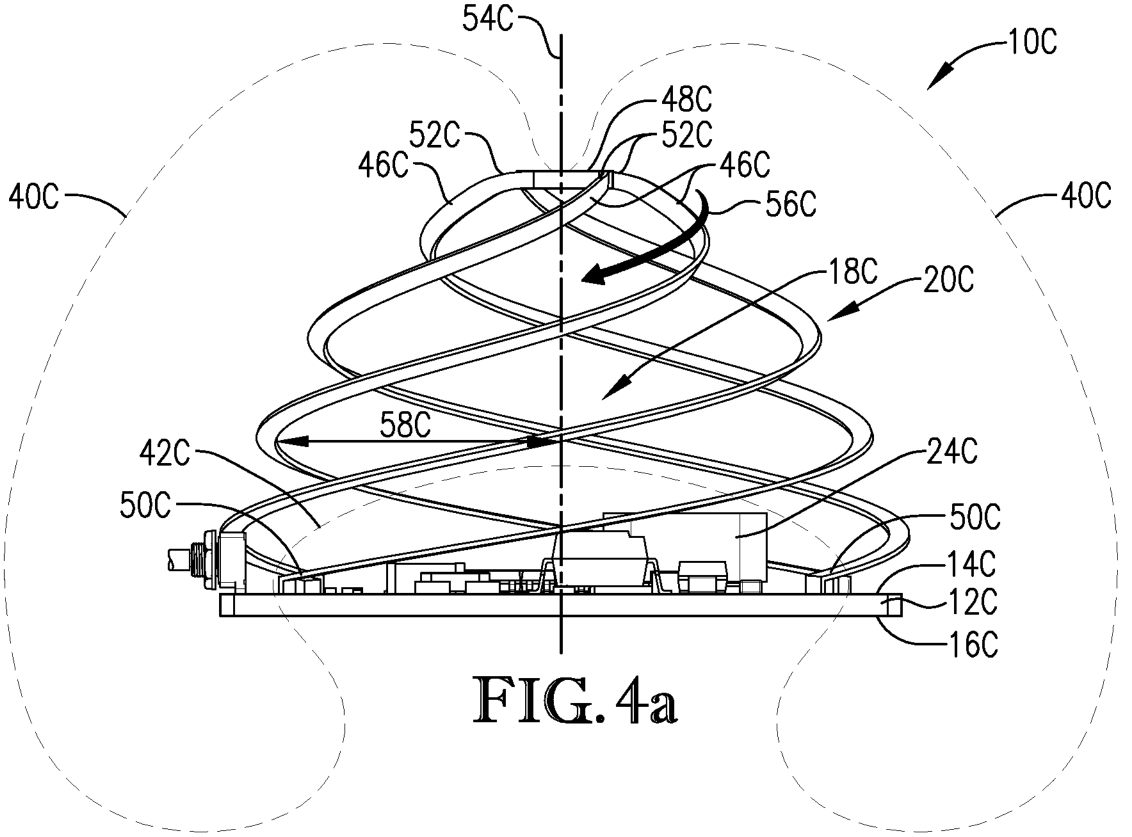
FIG. 4A is a side perspective view of an exemplary antenna system having a hemispherical antenna and constructed in accordance with a fourth embodiment of the present invention.
Figure 4B:
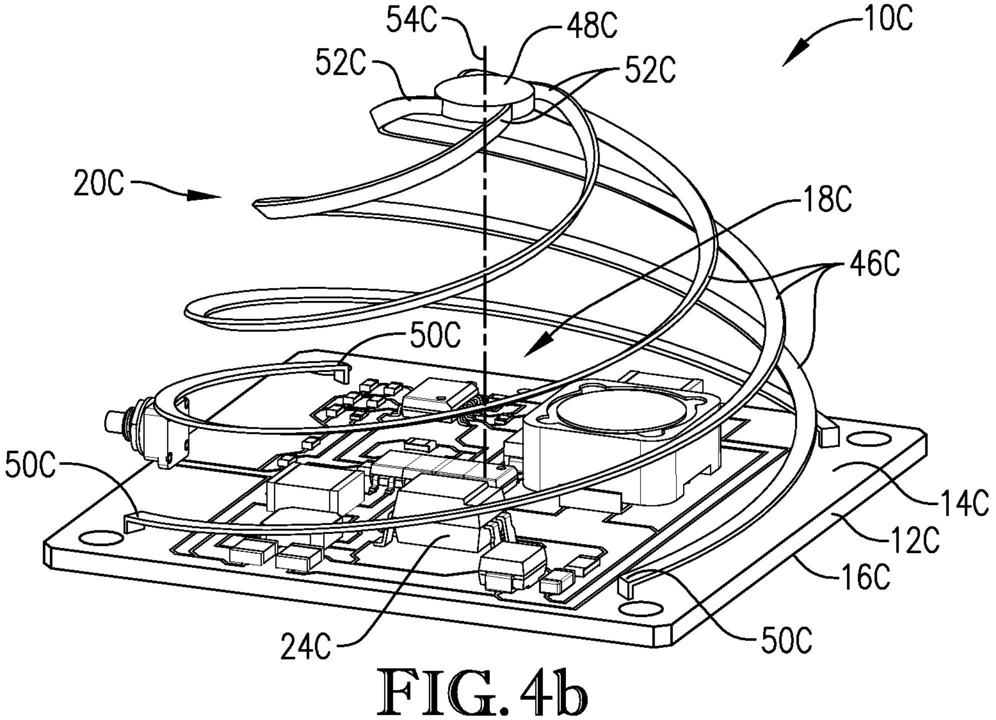
FIG. 4B is an elevated perspective view of the antenna system of FIG. 4A.

FIGS. 4A and 4B depict an exemplary antenna system 10C constructed in accordance with another embodiment of the present invention. The antenna system 10C comprises a substrate 12C, an antenna 20C supported by the substrate 12C, and a circuit component 24C positioned on the substrate 12C. The substrate 12C may be a portion of a circuit board, an independent board, a dielectric material, a nonconductive material, or the like. The substrate 12C is provided as a platform for supporting the antenna 20C and the circuit component 24C and includes a top surface 14C and a bottom surface 16C. In some embodiments, the substrate 12C may be similar to the previously-mentioned substrates 12, 12A, 12B having a recess, chamber, and/or platform for supporting one or more circuit components.

The antenna 20C is provided for sending and/or receiving electromagnetic waves. The antenna 20C may be an electrically-small, dipole antenna having any shape or pattern. For example, the antenna 20C may have one or more helical arms 46C that wind down from a top portion 48C thereby defining a space 18C above the substrate 12C. The arms 46C may form a first resonant structure and may be provided for transmitting and/or receiving a signal having a first frequency, frequency band, and/or resonance. Each arm 46C may include a proximal end 50C and a distal end 52C and encircle a first central axis 54C. Each arm 46C may encircle the first central axis 54C in a first direction 56C, which may be in a partially clockwise or counter-clockwise direction about the first central axis 54C. A radius 58C between each arm 46C and the first central axis 54C may decrease in a distal direction away from the proximal end 50C of the arm 46C. The arms 46C may form a semicircular, parabolic, or otherwise curved profile.

The space 18C defined by the arms 46C may be at least partially within the null region 42C of the radiation pattern of the antenna 20C. The substrate 12C may have any orientation in the space 18C without departing from the scope of the present invention. Additionally, any portion of the antenna 20C may be attached to a portion of the substrate 12C in any configuration without departing from the scope of the present invention. For example, the proximal end 50C and/or the distal end 52C of the arm 46C may be attached to the substrate 12C.

The antenna 20C may be fabricated using any number of techniques, including AM, electroless plating, electrolytic plating, or the like. The antenna 20C may be made of any conductive material. Additionally, any number of antenna types, shapes, materials, etc. may be used without departing from the scope of the present invention.

The circuit component 24C may be similar to the circuit component 24 discussed above and is positioned on the top surface 14C and/or bottom surface 16C of the substrate 12C.

In some embodiments, the circuit component 24C may be placed in the substrate 12C, such as in a recess or chamber similar to antenna systems 10, 10B. The circuit component 24C of the antenna system 10C may include both the matching circuit and the functional components for the antenna 20C. In one embodiment, the antenna system 10C may include a plurality of other circuit components such as a coin button battery or the like. The circuit component 24C may be in different locations on the substrate 12C for different antennas or radiation patterns without departing from the scope of the present invention.

In some embodiments, the antennas 20C may be a multi-resonant antenna, as disclosed in U.S. patent application Ser. No. 16/228,883, entitled "MULTI-RESONANT ANTENNA", filed on Dec. 21, 2018, the entirety of which is incorporated by reference herein. The antenna 20C may comprise a first resonant structure defined by the helical arms 46C, which also form the space 18C in which the circuit component 24C is positioned. Additional resonant structures may comprise one or more additional helical arms that surround the arms 46C of the first resonant structure, as disclosed in U.S. patent application Ser. No. 16/228,883.

Exemplary Antenna System with Spherical Antenna

Figure 5A:
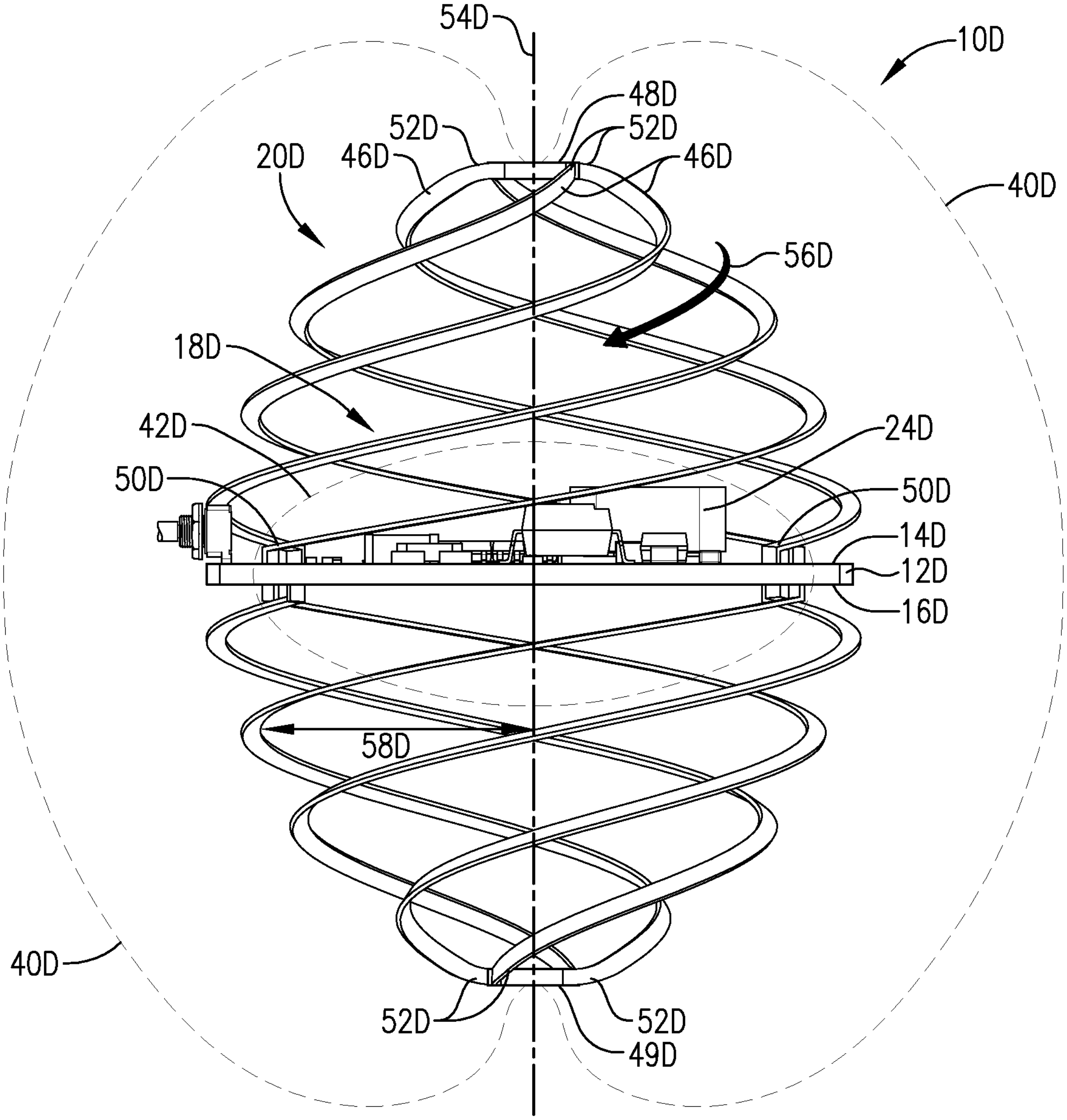
FIG. 5A is a side perspective view of an exemplary antenna system having a spherical antenna and constructed in accordance with a fifth embodiment of the present invention.
Figure 5B:
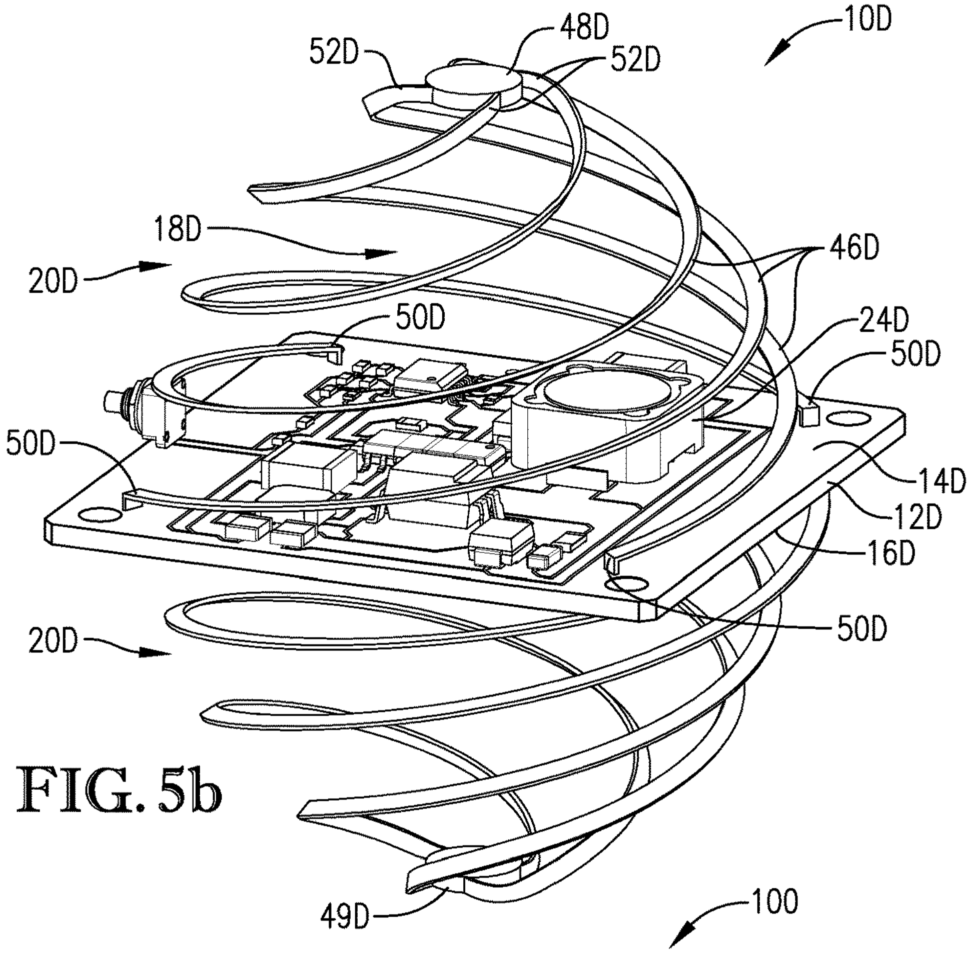
FIG. 5B is an elevated perspective view of the antenna system of FIG. 5A.

FIGS. 5A and 5B depict an exemplary antenna system 10D constructed according to another embodiment of the present invention. The antenna system 10D may comprise substantially similar components as antenna system 10C; thus, the components of antenna system 10D that correspond to similar components in antenna system 10C have a 'D' appended to their reference numerals.

The antenna system 10D depicted in FIG. 5 is like the antenna system 10C except that the antenna 20D is a substantially spherical antenna having one or more arms 46D that wind down from a top portion 48D and define a spherical space 18D around a substrate 12D. Each arm 46D may have a proximal region 50D and a distal end 52D. The arms 46D may form a first resonant structure and encircle a first central axis 54D so that a radius 58D between each arm 46D and the first central axis 54D increases in a proximal direction away from its distal end 52D to its proximal region 50D and thereafter decreases in a distal direction away from its proximal region 50D to a bottom portion 49D, thereby forming a substantially spherical profile.

The space 18D enclosed by the antenna 20D may be at least partially within the null region 42D of the radiation pattern of the antenna 20D. The substrate 12D may be positioned along an equator 60D of the space 18D. However, the substrate 12D may be positioned anywhere within the space 18D and with any orientation without departing from the scope of the present invention. The circuit component 24D of the antenna system 10D is positioned on or within the substrate 12D.

Similar to antenna system 10C, the antenna 20D may be a multi-resonant antenna having more than one resonant structures. The antenna system 10D may have an additional resonant structure defined by one or more additional helical arm that surrounds at least a portion of the helical arm 46D.

Exemplary Method of Fabricating an Antenna System

Figure 6:
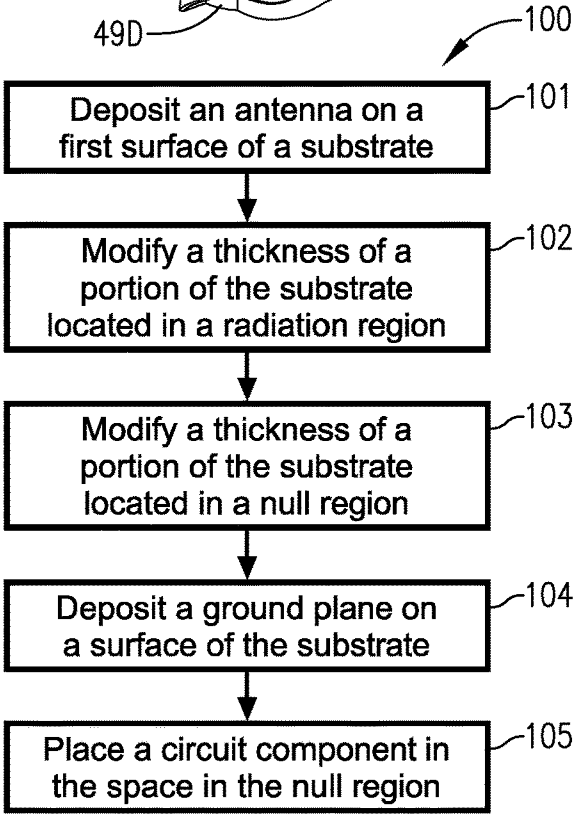
FIG. 6 is a flowchart illustrating at least a portion of the steps for constructing an antenna system in accordance with an embodiment of the present invention.

FIG. 6 depicts a listing of steps of an exemplary method 100 for fabricating an antenna system. The steps may be performed in the order shown in FIG. 6, or they may be performed in a different order. Furthermore, some steps may be performed concurrently as opposed to sequentially. In addition, some steps may be optional.

Referring to step 101, an antenna may be deposited on a first surface of a substrate. The antenna may be a microstrip patch antenna, electrically-small antenna, and/or a dipole antenna having any shape or pattern. The antenna may be deposited using AM, electroless plating, electrolytic plating, or the like. The antenna may be comprised of one or more conductive materials, such as metal and/or carbon-based conductors.

Referring to step 102, a thickness of a portion of the substrate located in a radiation region may be modified to achieve a desired antenna performance characteristic. The thickness may be reduced or increased, depending on the desired antenna performance characteristic. For example, a thickness of the substrate may be reduced to achieve a higher desired capacitance between the antenna and a ground plane of the antenna system. The thickness may be reduced via laser ablation, ion milling, etching, or the like. The thickness may be increased using AM, electroless plating, electrolytic plating, or the like.

Referring to step 103, a thickness of a portion of the substrate located in a null region below the antenna may be modified to define a space for a circuit component. The space may be a recess on a bottom side of the substrate or a chamber within the substrate. The space may be a platform protruding out from a remainder of the substrate. The space may be formed via laser ablation, ion milling, AM, electroless plating, electrolytic plating, or the like. In one embodiment, step 103 may include depositing one or more ground planes in the space for the circuit component. The ground planes may be made of conductive material, such as metal, conductive carbon, or the like. The ground planes may be vertical ground planes that line walls of the space. The ground planes may be deposited using AM, electroless plating, electrolytic plating, or the like.

Referring to step 104, a ground plane may be deposited on a second surface of the substrate. The second surface may be opposed to the first surface. The ground plane may have any shape or size, depending on the desired performance characteristics of the antenna. The ground plane may also be made of a conductive material, and formed using AM, electroless plating, electrolytic plating, or the like.

Referring to step 105, the circuit component may be placed in the space in the null region. The circuit component may include active components, passive components, antenna matching circuits, antenna driver circuits, or other electronic components, as discussed above. The circuit component may be placed via soldering the circuit component onto the substrate in the space, using bonding paste, or fabricating the circuit component on the substrate via AM, PVD, or the like. In the embodiment where the space has a ground plane, the circuit component may be placed on or adjacent to the ground plane.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of fabricating an antenna system, the method comprising:

depositing an antenna on a first surface of a substrate, the antenna being configured to emit a radiation pattern having a radiation region;

positioning a circuit component on the substrate below at least a portion of the antenna outside of the radiation region;

modifying a thickness of the substrate to a desired thickness corresponding to a desired capacitance between a ground plane and the antenna, the desired capacitance being configured to help the antenna generate a predetermined fringe electric field; and depositing the ground plane on a second surface of the substrate to obtain the desired capacitance between the ground plane and the antenna.

2. The method of claim 1, wherein the antenna is deposited via additive manufacturing.

3. The method of claim 1, wherein the thickness of the substrate is modified via at least one of laser ablation, ion milling, or etching.

4. The method of claim 1, further comprising a step of forming a recess on a second surface of the substrate, the second surface opposing the first surface, wherein the step of positioning the circuit component includes positioning the circuit component in the recess.

5. The method of claim 1, further comprising a step of forming a platform on a second surface of the substrate, the second surface opposing the first surface, wherein the step of positioning the circuit component includes positioning the circuit component on the platform.

6. The method of claim 1, further comprising a step of forming a chamber in the substrate below the first surface of the substrate, wherein the step of positioning the circuit component includes positioning the circuit component in the chamber.

* * * * *